United States Patent [19]

Giacobbe

[11] Patent Number: 4,717,406
[45] Date of Patent: Jan. 5, 1988

[54] CRYOGENIC LIQUIFIED GAS PURIFICATION METHOD AND APPARATUS

[75] Inventor: Frederick W. Giacobbe, Naperville, Ill.

[73] Assignee: Liquid Air Corporation, Walnut Creek, Calif.

[21] Appl. No.: 882,268

[22] Filed: Jul. 7, 1986

[51] Int. Cl.$^4$ ................................................ F25J 3/00
[52] U.S. Cl. ............................................ 62/18; 62/48; 62/475
[58] Field of Search ...................... 62/48, 474, 475, 18

[56] References Cited

U.S. PATENT DOCUMENTS

| | | | |
|---|---|---|---|
| 1,891,125 | 12/1932 | Van Gessel | 62/18 |
| 2,722,105 | 11/1955 | Keyes | 62/18 |
| 2,727,367 | 12/1955 | McKinney | 62/18 |
| 2,975,606 | 3/1961 | Karwat | 62/18 |
| 3,205,679 | 9/1965 | Geist et al. | 62/474 |
| 3,257,812 | 6/1966 | Shaievitz | 62/18 |
| 3,302,415 | 2/1967 | Royet | 62/48 |
| 3,418,824 | 12/1968 | Beutel et al. | 62/474 |
| 3,542,525 | 11/1970 | Pigford et al. | 62/18 |
| 3,566,611 | 3/1971 | Sterrett | 62/18 |
| 3,725,299 | 4/1973 | Turnock et al. | 62/18 |
| 3,793,846 | 2/1974 | Dehne | 62/474 |
| 4,150,548 | 4/1979 | Kemp et al. | 62/18 |
| 4,192,661 | 3/1980 | Johnson | 62/18 |

Primary Examiner—Ronald C. Capossela
Attorney, Agent, or Firm—George F. Bethel; Patience K. Bethel

[57] ABSTRACT

A process and an apparatus for removing impurities from liquified gases at cryogenic temperatures is provided which can be utilized on site at every stage of transport and storage subsequent to manufacture and prior to use. Liquified gas to be purified which is at cryogenic temperatures is passed preferably through a prefilter to remove solid particulates, followed by passage through an adsorbent bed to remove impurities from the gas and then through a postfilter to remove any entrained particles of adsorbent material from the gas stream. The process can be made continuous between, for example, a storage tank and an adsorption device. The apparatus includes at least one chamber having adsorbent material substantially filling it. A prefilter removes particulates upsteam of the adsorbent chamber and a postfilter downstream of said adsorbent chamber removes entrained adsorbent bed material. Use of two or more adsorbent chambers permits regeneration of one or more chambers while the remaining adsorbent chambers are being used for adsorption.

17 Claims, 8 Drawing Figures

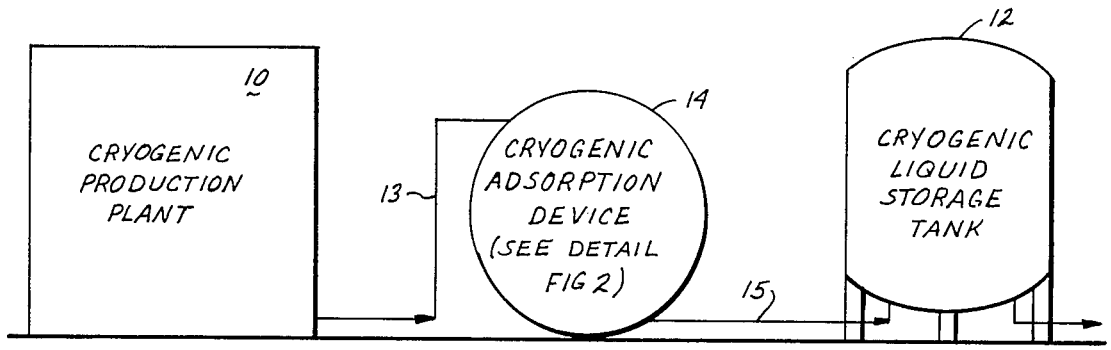
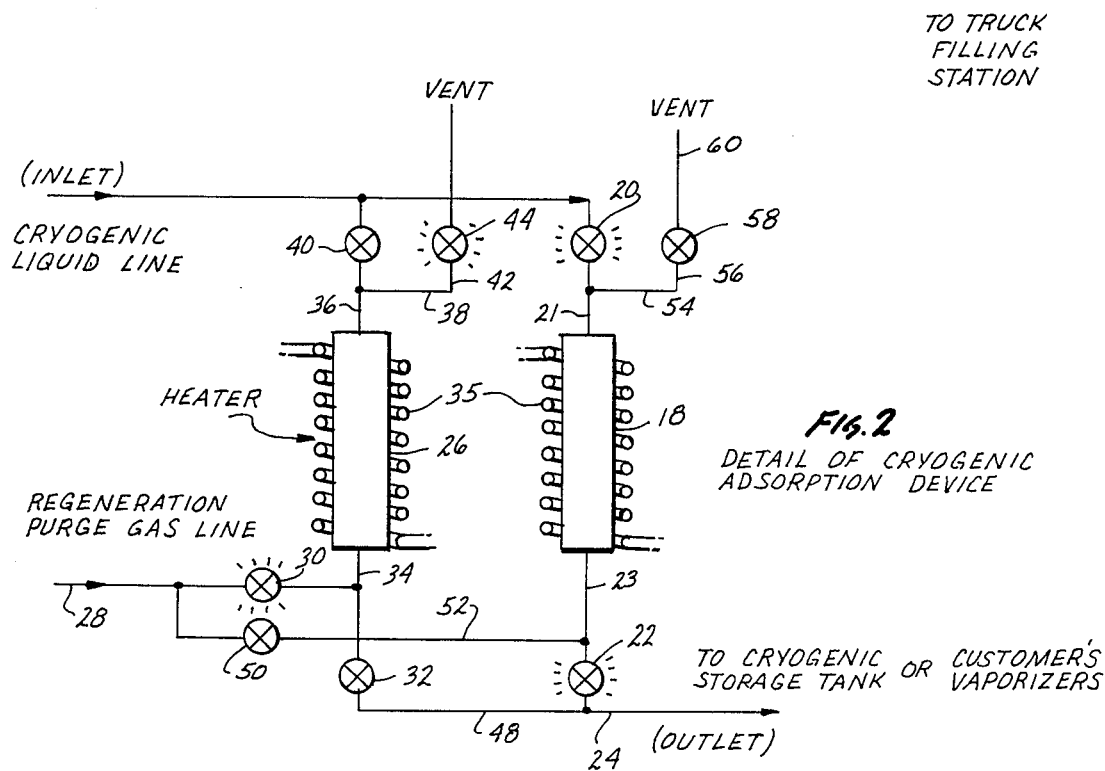
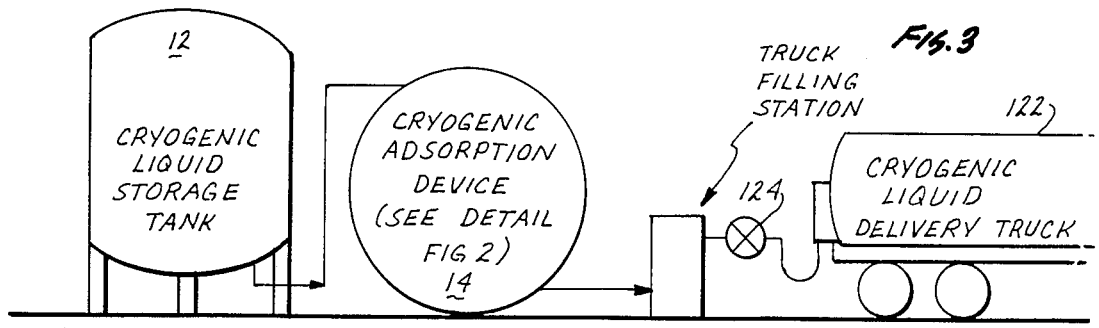

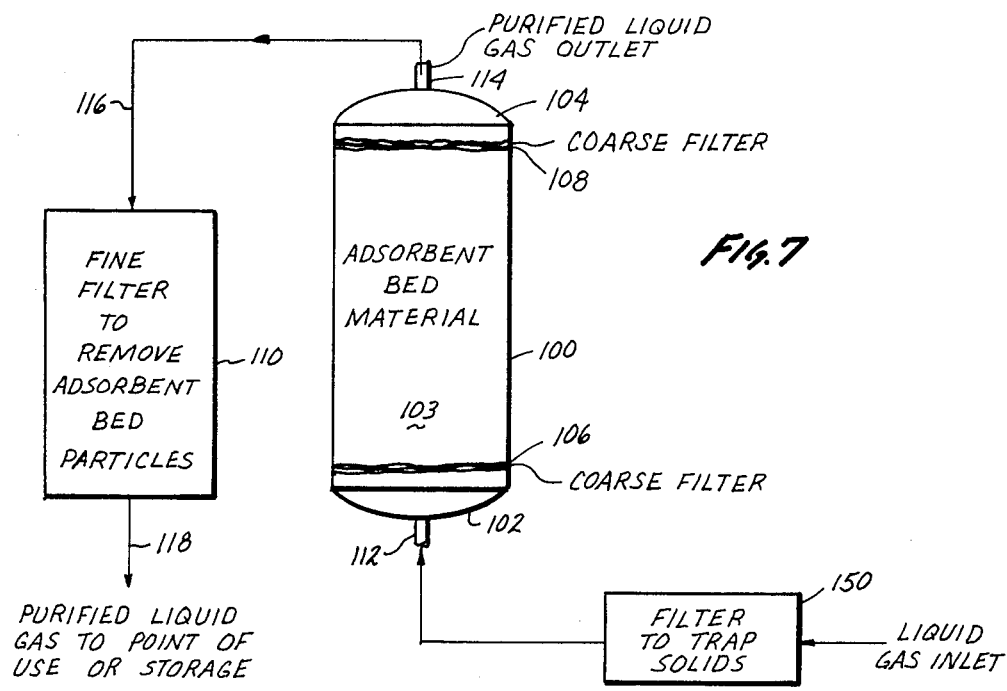
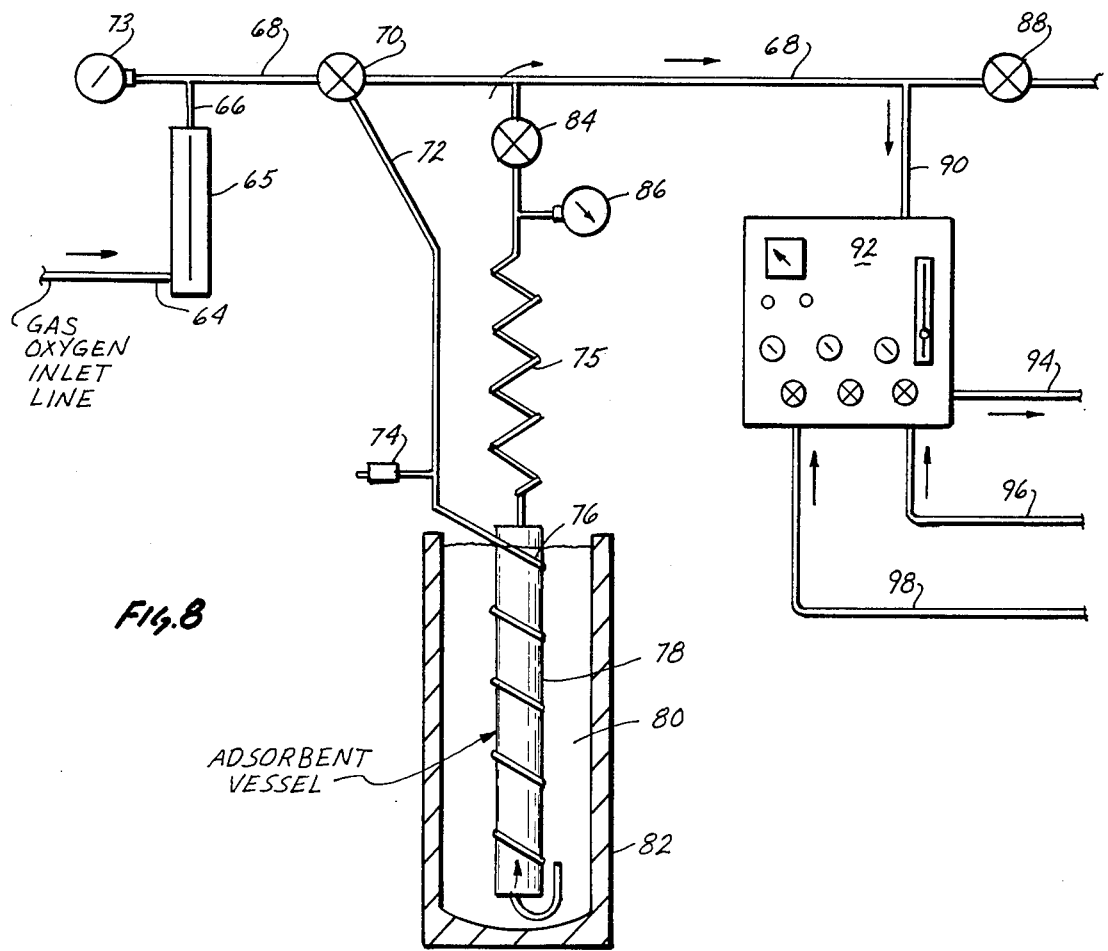

CRYOGENIC LIQUIFIED GAS PURIFICATION METHOD AND APPARATUS

FIELD OF THE INVENTION

This invention relates to a method for removing impurities from liquified gases at cryogenic temperatures and particularly to a method and apparatus which can be employed at the site of use.

BACKGROUND OF THE INVENTION

In recent years there has been an increasing requirement for extremely pure gases. This as been particularly true in the semi-conductor industry which uses both active and inert gases. Commonly, gases are supplied to such industries in the form of liquified gases which are then vaporized just prior to use. Various contaminants have been found in very small amounts in such liquified gases. Some of these impurities are originally present in the gas during manufacture and others are generated during the storage of the gases as a result of a contamination from storage vessels, condensation of moisture, exposure to air and other materials during the manufacture, transport, or storage thereof.

The requirements for such pure gases in the semi-conductor industry limit specific impurities to less than one part per million. For example, less than 1 ppm of water or carbon dioxide can be tolerated. These contaminants, both water and carbon dioxide, are commonly found in liquified gases in both solid and dissolved forms. Water can be initially present during the manufacture or can be picked up during the transport and storage of the liquified gases. Another common contaminant which can create problems is the presence of carbon dioxide in liquified oxygen.

While it has been known in the prior art to remove impurities from liquified gases using adsorbents, a method for the removal of such contaminants to the extent of producing a gas having less than 1 ppm of contaminants which is capable of being employed on site has not been available. Thus, the invention disclosed herein seeks to provide purification of liquified gases at various stages including: prior to storage, subsequent to storage, and prior to use.

The purificiation method and apparatus of the invention can also be used within storage tanks and within delivery trucks. In fact, the invention provides purification at any stage of transport of such liquified gases so that the resulting gases are highly purified and do not cause malfuntioning of instruments due to contaminants or the subsequent contamination of products, especially in the semi-conductor industry.

SUMMARY OF THE INVENTION

A method and apparatus are provided by the invention. The method includes first passing a liquified gas to be purified through a filter to remove any particulate matter. The liquified gas is then passed through an activated adsorbent for the first time and at a temperature and flow rate which is sufficient to remove dissolved impurities. From the adsorbent, the liquified gas is directed through a fine filter having a rated pore size of about 1 micron to about 100 microns to remove any particles of adsorbent which may have been entrained during the adsorbent process. The resulting purified cryogenic liquid is then ready for any use requiring a highly purified gas.

For best results, the liquified gas is subjected to the purification method at every stage of transfer and storage after its production and prior to use.

According to one embodiment, the liquified gas is purified by passage through the adsorbent device, as above described, subsequent to its production in a cryogenic production plant and prior to its transport to a cryogenic liquid storage tank. It is also preferred to again pass the cryogenic liquid from the storage tank through the cryogenic adsorption device, as above described, prior to filling a liquified gas delivery truck.

Also, prior to transfer of the liquified gas from the liquified gas delivery truck to the customer's storage tank, the liquified gas is also preferably purified by contact with an adsorption device as above described. Similarly, prior to use by the customer, the liquified gas from the customer storage tank preferably is again treated with the cryogenic adsorption device according to the above described method prior to being transferred to the customer's vaporizers.

If large amounts of liquified gas need to be purified, instead of using extremely large amounts of adsorbent materials, the method of the invention contemplates using multiple adsorption chambers or tubes in series so that one or more of these adsorption chambers or tubes can be regenerated by purging with a heated gas to drive off the impurities, while one or more of the other tubes can be used for adsorption of impurities.

According to another embodiment, liquified gas from a storage tank can be continuously circulated through a series of adsorbent chambers or tubes by means of a circulation pump until the desired purity level has been reached.

The device of the invention includes at least one chamber which is filled with an adsorbent material. Preferably the chamber is in the form of an elongated body such as a cylinder having an inlet and an outlet at the extreme ends of the elongated body for passage of liquified gas to be purified. Within each inlet and outlet are disposed filters to contain the adsorbent material within the chamber.

Conduits connected to the inlet and outlet are provided with valves to control the flow of liquified gas through the chamber. Other conduits, vents and valves can be provided to permit passage of a purge gas through the adsorbent bed for periodic regeneration of the adsorbent. This can be augmented by heating coils which surround the chamber.

If necessary, a pump capable of pumping cryogenic liquids can be used to force the liquified gas through the adsorbent chamber or chambers. Often the pressure on the liquid provides the necessary drive to force the liquid through the adsorent chamber or chambers.

Using the above described method and apparatus it is possible to provide highly purified liquified gases subsequent to their production and prior to and subsequent to storage and delivery.

BRIEF DESCRIPTION OF THE DRAWINGS

The invention will be more clearly understood with reference to the attached drawings in which:

FIG. 1 shows a schematic of one embodiment of the cryogenic liquified gas purification system of the invention.

FIG. 2 shows a somewhat detailed schematic of a dual adsorption bed apparatus and the connections for regeneration thereof.

FIG. 3 shows another embodiment of the system of the invention whereby purification of cryogenic liquified gas by adsorption takes place between the transfer of liquified gas from a cryogenic liquified gas storage tank and prior to its transfer to a cryogenic liquified gas delivery truck.

FIG. 7 shows an enlarged somewhat detailed representation of one adsorbent bed contained in a cylindrical member and a schematic stepwise representation of steps resorted to for purification of liquified gas and the subsequent removal of any entrained adsorbent bed particles prior to use.

FIG. 8 shows a schematic of laboratory apparatus used to verify the process according to the invention for purification of oxygen.

DETAILED DESCRIPTION OF THE INVENTION

Figure 4:
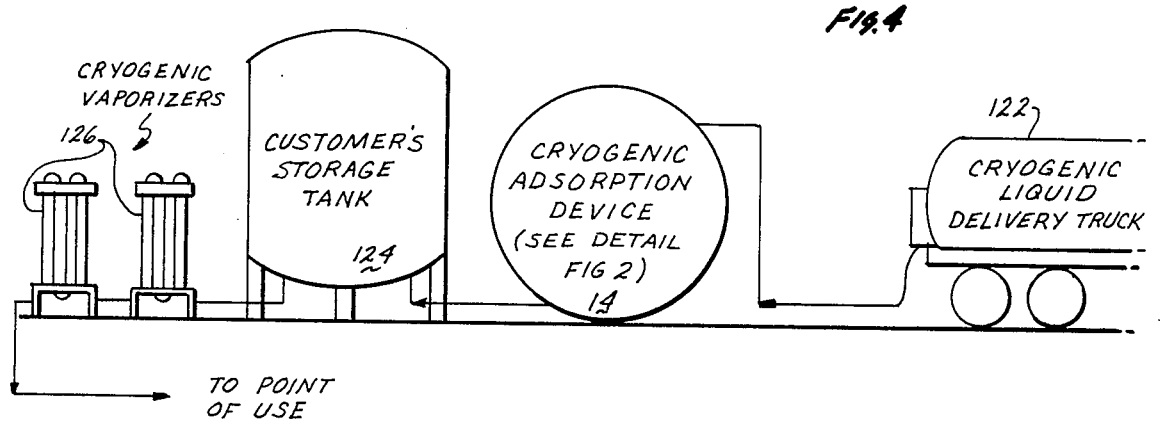
FIG. 4 shows the purification by adsorption of cryogenic liquified gas subsequent to transfer of the cryogenic liquified gas from a delivery truck and prior to its transfer to a customer's storage tank and subsequent use in a cryogenic vaporizer.

Referring now to FIG. 1 there is shown a cryogenic production plant 10 where cryogenic liquified gases are produced. The terms "cryogenic liquids" and "cryogenic liquified gases" as used herein and in the claims are meant to include but are not limited to liquified gases such as liquified oxygen, nitrogen, hydrogen, air, helium, argon, carbon dioxide, and mixtures thereof.

Cryogenic temperatures and pressures as used herein and in the claims are meant to include the temperatures and pressures at which the liquified gases remain in the liquid state. The exact temperatures and pressures then, will depend upon the identity of the gas itself.

After production at the cryogenic liquified gas production plant 10, and prior to transport of the cryogenic liquid into a storage tank 12, the cryogenic liquid is first purified by passage through line 13 and through cryogenic adsorption device 14. Only after purification is the cryogenic liquid transported through line 15 to the cryogenic liquid storage tank 12.

The cryogenic adsorption device 14 of FIG. 1 is substantially that which is shown in FIG. 7. As shown, a prefilter 150 filters liquid gas prior to its entry into the adsorbent vessel 100. The filter 150 is present to remove solids such as ice and $CO_2$ particles.

The adsorbent vessel 100 has a generally elongated cylindrical shape with a dome end cap 102 at the inlet 112 and a dome end cap 104 at the outlet 114. Within the adsorbent vessel 100 is an adsorbent bed material 103 which is tightly packed to provide the best surface contact between the adsorbent bed material 103 and the liquified gas to be purified.

Preferably, there is a coarse filter 106 within the dome end cap 102 at the inlet 112 and in addition, there is another coarse filter 108 within dome end cap 104 at the outlet 114 of the vessel 100. The filters 106 and 108 hold and contain the adsorbent material within the adsorbent vessel 100. Good results have been obtained using filters 106 and 108 having a mesh size similar to that of window screening.

Preferably, there is also a fine filter 110 located after the outlet of the adsorbent vessel 100 for purposes of removing any fine filter bed materials which have been entrained during passage of the liquified gas through the vessel 100. This filter preferably has a pore size rating in the range of 1 micron to about 100 microns.

The course of the flow of the liquified gas is through inlet 112 and dome end cap 102 through the coarse filter 106 and then through the adsorbent bed material 103. Upon exiting the adsorbent bed material 103 the liquified gas at cryogenic temperatures passes through coarse filter 108, dome end cap 104, and out through outlet 114 to line 116 where it passes through fine filter 110. Upon exiting fine filter 110 through line 118 the purified liquified gas can be directed to a point of use, storage, or transport for example by truck.

Another representation of a single adsorbent bed can be seen in FIG. 8. The device is used to prove the effectiveness of the process but is not the preferred manner of conducting the invention process. As shown, for convenience, oxygen in the gaseous state enters line 64 at a pressure of 100 psig (pounds per square inch gauge) where it passes through flow meter 65. From the flow meter 65 the gaseous oxygen passes through line 66 to line 68 through valve 70 to line 72. Pressure is measured by means of pressure gauge 73 at one end of line 68.

The gaseous oxygen continues through line 72 past relief valve 74 into heat exchanger 76. The heat exchanger 76 is wound in a coil around the adsorbent vessel 78 which is immersed in liquid nitrogen 80 which is contained in a Dewar flask 82.

As soon as the oxygen gas passes through the coils 76 which are immersed in liquid nitrogen, it immediately liquifies. The oxygen is then in the liquid state while it is passing through the adsorbent vessel 78.

After passage through the adsorbent vessel 78 containing, for example, silica gel, the liquid oxygen continues through line 75 where it vaporizes and passes through valve 84 and is returned to line 68. The pressue is monitored during this flow by means of pressure gauge 86. Flow through line 68 is controlled by means of valve 88. A portion of the gaseous oxygen in line 68 is diverted through line 90 for analysis through a hydrocarbon analyzer 92, such as a Teledyne trace hydrocarbon analyzer, which gas is vented through line 94. At the same time, zero gas, in this case a highly purified form of oxygen used for calibration to get a zero reading, can be introduced through line 96 into the analyzer to calibrate it and span gas, in this case a highly purified oxygen gas containing a known quantity of an impurity, can be introduced into the analyzer 92 through line 98.

The invention is not limited to the use of only one adsorbent bed. In the manner shown in FIG. 2, two or more adsorbent beds can be connected in series and regenerated as desired. This can be done either one after the other or several at a time alternating with those remaining. Here, a cryogenic liquid line 16 delivers liquid cryogen to adsorption bed 18 when valve 20 is open. The liquid cryogen passes through the adsorption bed 18 where impurities are adsorbed by the material of which the adsorbent bed is composed. The liquid cryogen exiting from the adsorbent bed 18 passes through outlet 24 when valve 22 is open for subsequent use, storage, or delvery, as indicated in FIGS. 1, 3, 4, and 5.

At the same time that the above cryogenic liquid is passing through adsorption bed 18, adsorption bed 26 can be in the process of regeneration. In this instance, regeneration purge gas entering through line 28 when valve 30 is open and valve 32 is closed, passes into line 34 where it flows upwardly through adsorption bed 26 to line 36 and line 38 when valve 40 is in the closed condition. The purge gas passes through line 42 when valve 44 is in the open condition. It can then be vented to the atmosphere or to any other place outside of the system as indicated at point 46.

While the regeneration is taking place in adsorption bed 26, heating coils 35 surrounding adsorption bed 26 are turned on by a means not shown to accelerate the regeneration process. The heat drives off the adsorbed contaminants which are carried away by the purge gas, aided by the evaporation of any residual liquified gas remaining within the adsorbent bed 26.

After adsorbent bed 26 has been regenerated with the purge gas carrying off all the impurities which had been adsorbed from the cryogenic liquid, it can then be used for adsorption of impurities from the cryogenic liquid through line 16. In this case, valve 20 and valve 44 are closed and valve 40 is open. This causes liquid to pass through line 16 through valve 40 and line 36 and through adsorbent bed 26. Here, valve 30 is closed which forces the cryogenic liquid to continue through line 34 to valve 32 which is open, through line 48 to the outlet 24 since valve 22 is in the closed condition.

At the same time, adsorbent bed 18 is being regenerated by opening of valve 50 in line 52 which directs the purge gas through line 23 and the adsorbent bed 18 since valve 22 is in the closed condition. The purge gas then passes from adsorbent bed 18 through line 21 to line 54 since valve 20 is in the closed condition. The purge gas continues through line 56 and open valve 58 to exit at vent 60.

While the regeneration is taking place in adsorption bed 18, heating coils 35 surrounding adsorption bed 18 can be turned on by a means not shown to accelerate the regeneration process. The heat drives off the adsorbed contaminants which are carried away by the purge gas, aided by the evaporation of any residual liquified gas remaining within the adsorbent bed 18.

Thus, the adsorbent beds 18 and 26 can be run cyclically such that while one is being used to adsorb impurities, the other can be regenerated.

FIG. 2 is a preferred arrangement of adsorption chambers because the liquid flow is from top to bottom. During regeneration this direction is reversed so that the purge gas is upflow which aids in carrying away the impurities from the adsorbent bed.

The invention is contemplated for use in all of the various stages to which liquified gases are commonly exposed after the production thereof. For example, the liquified gas is preferably passed through a cryogenic adsorption device 14 prior to passage into a liquid storage tank 12 as shown in FIG. 1.

After such storage in a liquid storage tank 12 the liquified gas in the form of a cyrogenic liquid is preferably again passed through a cryogenic adsorption device 14 prior to transport into a cryogenic delivery truck 122 through valve 124 as shown in FIG. 3.

Upon delivery, the cryogenic delivery truck 122 preferably discharges the cryogenic liquified gas into a cryogenic adsorption device 14 to remove any impurities which have been picked up during the storage and delivery time. From the cryogenic adsorption device 14 the cryogenic liquid can then be transported to the customer's storage tank 124 which can be directly passed to a series of cryogenic vaporizers 126 as shown in FIG. 4.

Figure 5:
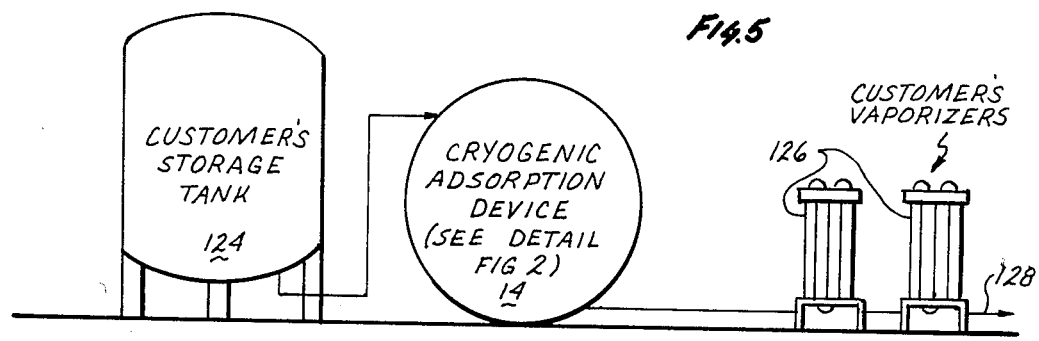
FIG. 5 shows a preferred embodiment whereby the liquified gas is purified by passing it through the adsorption device of FIG. 2 prior to its transport to the customer's vaporizers.

Alternatively, and most preferaby, as shown in FIG. 5, the cryogenic liquid in the customer's storage tank 124 is purified by passage through a cryogenic adsorption device 14 prior to its transport to the cryogenic vaporizers 126 from which the cryogenic liquid goes directly to the point of use 128.

Thus, each time the cryogenic liquified gas is subjected to storage, or transport to or from a truck, or prior to any change of its location, it is preferably treated again with the cryogenic adsorption device 14. Only in this manner, can liquified gases having extremely small amounts of impurities be produced. This is due to the fact that so many impurities are picked up in the atmosphere to which the cryogenic materials are exposed, from condensation of moisture, from contamination in the storage tank, as well as contamination caused by the materials of which the transport lines are composed.

The storage pressue maintained in a cryogenic liquid storage tank 12 as shown in FIG. 1 is commonly in the range of about 80 psig to about 200 psig. In many instances, this pressue is sufficient to drive the cryogenic liquid through the adsorbent device. In other instances, a cryogenic pump can be used. Such pumps are standard on most commercial cryogenic delivery trucks. Since the pump rate in these trucks is generally very high, the adsorption device required is significantly larger than would be needed for lesser flow rates.

Figure 6:
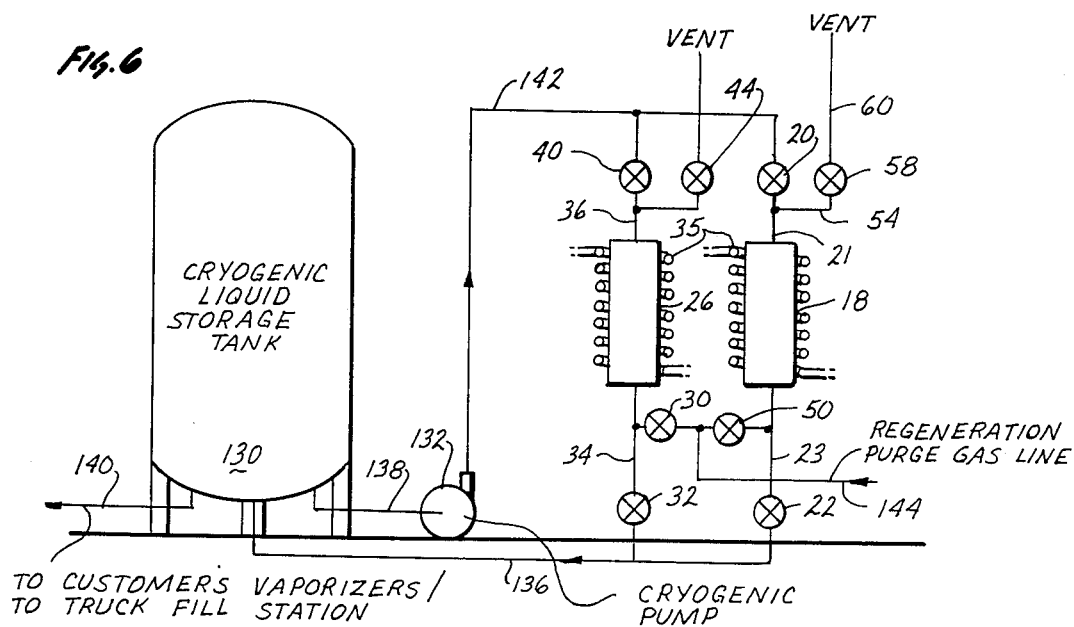
FIG. 6 shows another embodiment of the invention wherein the cryogenic liquified gas in a storage tank is continuously recirculated through a series of adsorbent beds to continuously remove impurities while making possible the regeneration of the adsorbent beds on an alternate basis.

Another preferred embodiment is shown in FIG. 6. Here, cryogenic liquified gas contained within a cryogenic storage tank 130 is constantly circulated through a cryogenic adsorption device 14 by means of a cryogenic pump 132. In this instance, the adsorption device is substantially the same as that shown in FIG. 2. Its effect is to continuously purify the gas so that it is always in a high state of purity. This permits the use of smaller size adsorption vessels since the flow rate can be made much slower since there is constant circulation. Regeneration by means of a purge gas can take place in the same manner as described for FIG. 2.

More specifically, the cryogenic liquid or liquified gas from the storage tank 130 is drawn by pump 132 through line 138 to line 142 where it is passed to either adsorption vessel 26 or adsorption vessel 18 depending on whether valve 40 or valve 20 is open. If valve 40 is open the liquid passes through line 36 into adsorption vessel 26 and then to line 34 through valve 32 to line 136 which returns it to the storage tank 130. At the same time that this is taking place, adsorption vessel 18, if necessary, can be regenerated basically as described for FIG. 2.

Thus, purge gas can enter line 144, and with valves 22 and 30 being closed and valve 50 open, the purge gas passes upwardly through line 23 and adsorption vessel 18 through line 21. With valve 20 closed, the purge gas exits through line 54 and valve 58 to vent 60. Similarly, by closing the appropriate valves and opening the appropriate valves, adsorption vessel 18 can be utilized to adsorb impurities from the cryogenic liquid in storage tank 130 while adsorption vessel 26 is being regenerated with purge gas.

As an alternative to using a separate purge gas or as an adjunct thereto, in some instances it might be desirable to use cryogenic liquified gas as the purge gas. This is achieved by allowing a portion of the gas to vaporize by allowing it to come to ambient temperature. In this way, no new contaminants would be introduced. Also, in some on site situations it might be more convenient and less costly since a source of purge gas might not be available.

It is believed that this invention is most important since the purification may take place on site. Until the present time this has not been resorted to for purposes of providing ultrapurified liquified gases.

THE PROCESS

The process of the invention includes first providing an adsorption vessel which is tightly packed with a single adsorption material or a combination of several adsorption materials. By the term "adsorption" is meant the taking up of a gas, vapor, or dissolved material on the surface of a solid adsorbent. While it is believed that the purification takes place by adsorption, it is possible that adsorption also takes place. Thus, this process is not intended to be excluded.

The selection of an adsorption material will, of course, depend upon the identity of the liquified gas as well as upon the impurities desired to be removed. Examples of adsorbent materials which can be used in the invention process include but are not limited to molecular sieves, for example, Linde 13 X molecular sieve and Davidson 13 X molecular sieve, activated charcoal, silica gel, and activated alumina. Standard, commercially available adsorbent materials provide acceptable purity.

The term "molecular sieve" is used to described zeolites or similar materials whose atoms are arranged in a crystal lattice in such a way that there are a larger number of small cavities and are connected by smaller openings or pores of precisely uniform size. Synthetic zeolites, for example, are available in several pore sizes: for example, 3, 4, 5 and 10 angstrom units in diameter. These materials are very good for the removal of water from cryogenic liquified gases. They are also useful for removal of hydrogen sulfide, carbon dioxide and other polar molecules as well as selected non-polar molecules.

Before use of the adsorbent material, it is preferably activated with a heated inert gas such as nitrogen for a period sufficient to purge any undesirable adsorbed materials from the adsorbent.

Although the adsorbent can be arranged in any convenient manner, it is preferably used in the form of a packed column enclosed in a cylindrical type of a housing substantially as shown in FIG. 7. This permits the liquified gas to have sufficient contact time with the adsorbent materials prior to its exit.

In some instances, the exact particle size of the adsorbent material can be important. Excellent results have been obtained using both cylindrical and spherical shaped adsorbent material. Preferably, the size range of the adsorbent will be one in the range of to about 1/16 inch to about ¼ inch diameter by about ¼ inch to about ½ inch in length for the cylindrical shape, and spherical beads having a diameter in the range of about 1/16 inch to about ¼ inch.

In addition, it is prefererd that there is a filter having a pore size rating of about 1 micron to about 1000 microns at the inlet. At the outlet of the adsorbent material there is preferably a 1 micron to about a 100 micron filter. The first filter traps solid particulates such as ice (water) and solid carbon dioxide, while the post filter removes any entrained particles of the adsorbent material from the cryogenic liquified gas circulating therethrough.

After the vaporizers there is also a fine gaseous filter prior to the point of use to insure gas purity. This filter can be finer than the filters used for the liquids and is preferably of the order of less than 1 micron to about 100 microns in pore size rating. Good results have been obtained using a filter of less than 1 micron.

The temperatures at which adsorption takes place is very important. It has been found that adsorption is enhanced at extremely low temperatures. Therefore, the temperature of the system as well as the pressure certainly should be sufficient to keep the liquified gas in a liquid state. The exact pressure temperature will depend on the identity of the liquified gas which is being purified.

In order to keep the temperatures sufficiently low to maintain the gases in a liquid state, it is necessary to provide low temperature insulation throughout the system including for example, on the circulation lines (preferably double wall stainless steel with a vacuum between), the pumps, adsorbent vessels, filters, meter and storage tanks, as well as the use of cryogenic valves, which have an extended stem.

The flow rate of the liquified gases through the adsorbent vessel containing the adsorbent will depend upon the size of the adsorption vessel and the amount of the adsorbent material contained therein.

Flow rate of the liquified gas through the adsorbent bed should be slow enough to permit adsorption of the impurities from the liquid flowing through it. This will depend upon the amount of impurities initially present as well as upon the size of the adsorbing vessel, the temperature, and the identity of the liquified gas to be purified. The exact values will have to be determined empirically.

Cryogenic liquid flow can be from top to bottom as shown in FIG. 7 or from bottom to top as shown in FIG. 3. Cryogenic liquid flow from top to bottom is most preferred when coupled with regeneration by means of gas flow from bottom to top. In this manner the gas upflow aids in driving off the adsorbed impurities.

Commonly, the liquid flow rate which has produced excellent results using an adsorbent vessel of about 6 inches in diameter and approximately 6 feet in length has been equivalent to a gas flow rate of 100 cfph (cubic feet per hour of gas) to about 1000 cfph of gas. This corresponds to varying flow rates of liquified gases depending upon the molecular weight of the liquified gas.

For nitrogen, the equivalent liquid flow rate would be in the range of about 1.07 gph (gallons per hour) to about 10.7 gph. For oxygen, the equivalent liquid flow rate would be in the range of about 0.869 gph to about 8.69 gph. In the case of hydrogen, the equivalent liquid flow rate would be in the range of about 0.882 gph to about 8.82 gph, and for air, it would be in the range of about 1.03 gph to about 10.3 gph. For helium, the equivalent liquid flow rate would be in the range of about 0.992 gph to about 9.92 gph. For argon, the equivalent liquid flow rate would be in the range of about 0.889 gph to about 8.89 gph.

Also, it is preferred to maintain the liquid gas pressure during the transfer and adsorption processes. For this reason extremely small diameter filters are not preferred since their use would result in a pressure drop due to the high pressure required to force the cryogenic liquids through them.

In some instances, such as for example in the case of liquified oxygen, occasionally there will be found solid particles of carbon dioxide within the liquified gases. These solid particles will preferably be removed by passing the liquified gas through a prefilter prior to passage of the liquified gas through the adsorption vessel. This filter preferably is one having a pore size rating in the range of about 1 micron to about 1000 microns. Thus, by using the prefilter, the solid particles of carbon dioxide are removed before entry in the adsorption vessel and the dissolved impurities are removed by exposure to the adsorbent material.

If the prefilter is not used, most of the solid particles present initially in the liquified gas are removed during passage of the liquified gas through the first half of the adsorbent bed while most of the dissolved impurities are normally removed during the passage of the liquified gas through the last half of the adsorbent bed.

During the time that the liquified gas is flowing through the adsorbent, minute particles of the adsorbent bed can be entrained in the liquid. Most of these are removed within the coarse screen found at the exit of the adsorption vessel as shown in FIG. 7.

Any particles which have not been removed at this point can be removed by passage of the liquified gas into a fine postfilter which will remove any remaining particles from the adsorbent bed. This filter preferably is one having a pore size rating in the range of about 1 micron to about 100 microns. Upon exiting the postfilter, the liquified gas can be directed to the point of use or can be transported to a truck or storage tank.

As an alternative, or in addition thereto, the fine filter to remove particles of adsorbent bed material can be placed in the line after the vaporizer. In this case it would remove the particles from the gas itself and can be a 100 micron to as small as a 0.02 micron filter since it is gas that is being filtered at this point.

The following examples are given for purposes of illustrating the invention and are not intended to constitute a limitation thereof.

EXAMPLE 1

An apparatus substantially as shown in FIG. 8 was used to adsorb impurities from liquified oxygen gas from a storage tank. The adsorbent used was Linde molecular sieve which was first activated by passing heated nitrogen gas therethrough. The nitrogen gas flow rate was between 10 SCFH (standard cubic feet per hour) and 20 SCFH. The surface temperature of the adsorption vessel during adsorbent activation was maintained in the range of 275° C. and 300° C. using external heating tapes. Flow of the heated nitrogen gas was continued for about 3 hours. At the end of this period, the adsorption vessel was allowed to cool to ambient temperature. At this time, liquified oxygen gas from a storage tank was passed through the adsorption device from the bottom to the top for a period of about 15 minutes.

Prior to the adsorption process, the carbon dioxide concentration was 4.4 ppm. After 15 minutes of adsorption, the carbon dioxide concentration was reduced to less than 0.1 ppm.

EXAMPLE 2

Substantially the procedure of Example 1 was repeated wherein a 40 gallon container of liquid oxygen was discharged through a molecular sieve adsorption vessel in about 20 minutes. This amounted to a flow rate of about 2 gallons per minute. Prior to the adsorption process the carbon dioxide concentration in the liquid oxygen was about 5 ppm. At the end of the 20 minute period, the carbon dioxide concentration, in the oxygen that had been purified, was less than 0.5 ppm.

EXAMPLE 3

Substantially the procedure of Example 1 was repeated in which 40 gallons of liquid oxygen from a 3000 gallon storage tank was passed through a molecular sieve adsorption vessel containing Linde molecular sieve. After passage through the adsorption vessel, the liquid oxygen was transported to a 40 gallon storage container. The flow rate through the adsorption vessel was 2 gallons per minute. The initial carbon dioxide conentration was about 5 ppm. At the end of the adsorption process, the carbon dioxide concentration, in the 40 gallons of purified liquid oxygen, was measured at less than 0.5 ppm.

The above examples show that the process is capable of significant reduction of impurities such as carbon dioxide in liquified gases such as liquified oxygen to concentrations lower than 1 ppm.

Essentially, the process described for the activation of the molecular sieve is basically the same process used to regenerate the adsorption material after it has reached its saturation point during adsorption.

In some instances, an inert gas such as nitrogen, preferably heated to above ambient temperature, is passed through the adsorbent bed for a time sufficient to remove the adsorbed materials.

As an alternative, a portion of a liquified gas which is being purified can be diverted from the adsorption process, permitted to vaporize, heated and then used as the purge gas. This would result in some loss of product. However, since the process is particularly suitable for use on site and does not require the provision of additional gas, it can be quite advantageous.

In some instances extremely large adsorbent beds might be required. In this instance, it is preferred to use multiple adsorption vessels in series in the manner shown in FIG. 2. Although FIG. 2 only shows two adsorption vessels, it would be apparent to those skilled in the art that multiple vessels can be used. These can then be alternately used to adsorb impurities and then be regenerated by purging with a heated inert gas.

Alternatively, as shown in FIG. 6, adsorption can take place by constant recirculation of liquified gas through adsorption vessels so that purity of the liquified gas is constantly maintained.

Various modifications of the above described process and apparatus are contemplated which will be obvious to those skilled in the art and which can be resorted to without departing from the spirit and scope of the invention as defined by the following appended claims.

I claim:

1. A method for the on-site adsorption of impurities contained in liquified gases prior to and/or subsequent to storage and transport and prior use comprising:
    passing said liquified gas through an activated adsorbent material at cryogenic temperatures and pressures for a time sufficient to permit adsorption of the impurities by the adsorbent; and,
    passing said liquified gas issuing from said adsorbent through a filter to remove any particles of entrained adsorbent contained therein.

2. A process as claimed in claim 1 further comprising:
passing said liquified gas through a prefilter to remove solid particulates prior to passage through said adsorbent.

3. A process as claimed in claim 1 wherein:
said process includes continuous recirculation between said source of liquified gas and said adsorbent material.

4. A process for the on-site adsorption of impurities contained in liquified gases prior to and/or subsequent to storage and transport and prior to use comprising:
passing said liquified gas through an activated adsorbent material at cryogenic temperatures and pressures for a time sufficient to permit adsorption of the impurities by the adsorbent;
said adsorbent material being contained within an adsorbent chamber;
at least two separate adsorption chambers are used, and further comprising:
purging at least one of said adsorption chambers to drive off adsorbed impurities from said adsorbent bed while the remaining chambers are being used for adsorption.

5. A process as claimed in claim 4 further comprising:
monitoring said liquified gas flowing from said adsorbent bed for the presence of impurities; and
purging said adsorption bed to drive off the impurities contained therein when said monitoring step indicates the presence of impurities in said liquified gas above a predetermined level.

6. A process as claimed in claim 5 wherein:
said purging step comprises purging with an inert gas; and,
wherein said activated adsorbent material is arranged in a form which is substantially taller than it is wide and having a top and bottom, and further comprising:
passing said cryogenic liquid from top to bottom through said activated adsorbent material; and,
purging said adsorbent material by passing said purge gas through said adsorbent material from bottom to top.

7. A process as claimed in claim 5 wherein:
said purging step comprises diverting a portion of said purified liquified gas;
converting it from the liquid state to the gaseous state;
passing said resulting gas through said adsorbent bed for a time, and at a temperature, pressure, and flow rate which is sufficient to drive off the adsorbed impurities.

8. A process as claimed in claim 4 wherein:
said adsorption process is conducted prior to storage of a liquified gas, and/or subsequent to its storage, and/or prior to its transport to a truck, and/or subsequent to its transport in a truck; and/or prior to its storage at a user's facility, and/or subsequent to its storage at a user's facility, and/or prior to its final use.

9. A process as claimed in claim 6 further comprising:
activating said adsorbent bed and purging it with a heated inert gas.

10. A process as claimed in claim 4 wherein:
said adsorbent materials are selected from molecular sieves, activated charcoal, silica gel, and activated alumina, and mixtures thereof.

11. A process as claimed in claim 4 wherein:
said adsorbent chamber is in the form of an elongated body and said adsorbent bed is in the form of a tightly packed column substantially filling said elongated body, and said liquified gas is made to travel from one end of said column to the other during the purification thereof.

12. A process as claimed in claim 11 wherein:
said adsorbent bed materials are selected from cylindrical shaped particles having a particle size in the range of about 1/6 inch to about ¼ inch in diameter by about ¼ inch to about ½ inch in length and spherical shaped particles having a particle size in the range of about 1/16 inch to about ¼ inch diameter.

13. A process as claimed in claim 4 wherein:
said process includes continuous recirculation between said source of liquified gas and said adsorbent material.

14. Apparatus for the purification of liquified gases comprising:
at least one chamber;
adsorbent bed material substantially filling and enclosed by said chamber;
an inlet to said chamber for entry of liquified gas to be purified;
an outlet to said chamber for exit of said liquified gas;
a filter at said inlet;
a filter at said outlet, said filters acting to retain said bed material within said chamber;
pump means in communication with said liquified gas to be purified and said chamber to cause said liquified gas to flow through said chamber;
valve means connected to each said inlet and each said outlet for flow control of liquified gas through said chamber; and,
heating means in communication with each said chamber for heating said chamber and said adsorbent bed for regeneration thereof.

15. Apparatus as claimed in claim 14 further comprising:
a filter downstream of said chamber outlet to remove entrained particulates of adsorbent bed material from said purified liquified gas stream.

16. Apparatus as claimed in claim 15 further comprising:
a filter upstream of said chamber inlet to remove solid particles from said liquified gas stream prior to passage through said chamber.

17. Apparatus as claimed in claim 16 further comprising:
means for gas impurity detection and analysis disposed downstream of said adsorbent chamber to signal when impurities in said purified gas have risen above a predetermined level indicating that said adsorbent bed material is saturated with impurities and is in need of regeneration and purging.

* * * * *